United States Patent
Wally, Jr.

[15] 3,645,621
[45] Feb. 29, 1972

[54] CAMERA-PROJECTOR WITH VACUUM FILM PLATEN

[72] Inventor: Joseph H. Wally, Jr., Shawnee Mission, Kans.

[73] Assignee: Western Blue Print Co., Kansas City, Mo.

[22] Filed: May 27, 1970

[21] Appl. No.: 40,881

[52] U.S. Cl..................................355/76, 355/73, 353/23, 353/95
[51] Int. Cl..............................................G03b 27/64
[58] Field of Search..................355/73, 76; 353/23, 95, 120, 353/122

[56] References Cited

UNITED STATES PATENTS 3,433,564   3/1969   Lahr.................................355/76
3,115,808   12/1963  Durst................................355/73

Primary Examiner—Samuel S. Matthews
Assistant Examiner—E. M. Bero
Attorney—Johnson, Dienner, Emrich, Verbeck and Wagner

[57] ABSTRACT

Camera-projector having a frame-enclosed transparent platen supported on the first surface of its condenser, the peripheral edge of the platen being spaced from the frame to provide a continuous channel thereabout which is connected to an evacuating pump. The frame has registration pins by which film is located on the platen with its margin over the channel, and the edge of the platen is notched at spaced intervals to promote vacuum pull down of the film flat against the platen surface.

18 Claims, 8 Drawing Figures

*INVENTOR.*
JOSEPH H. WALLY Jr.

BY Johnson, Dienner, Emrich, Verbeek & Wagner

ATTORNEYS

CAMERA-PROJECTOR WITH VACUUM FILM PLATEN

This invention relates generally to photographic apparatus and particularly to apparatus which is used to photograph an image of graphic sheet material on film and thereafter to projection-print copies thereof using the negative processed from the film. However, as will be apparent, the invention is not restricted to such apparatus and will have utility in other apparatus.

The principal object of the invention is to provide novel and improved means in such apparatus for supporting film and/or a negative processed therefrom.

In my application for U.S. Pat., Ser. No. 836,317, filed June 25, 1969, there is disclosed a camera-projector having an optical head which contains an objective and is provided with a platen spaced behind the objective on which the film is located when using the apparatus to photograph material mounted on a vertical subject holder in front of the optical head. The optical head moves along overhead tracks toward and away from the subject holder in accordance with the image reduction factor required. The objective is also independently adjustable within the optical head toward and away from the film platen to permit sharpening image focus for different spatial settings of the optical head, more particularly its film platen, from the subject holder.

The platen is transparent and the optical head includes a point source of light and condenser lens means which are positioned behind the film platen and utilized to project an image of the negative on the film platen to sensitive paper mounted on the subject holder in order to print a copy or copies thereof. The same or different spatial settings for the optical head and its objective may be used in accordance with image magnification or reduction requirements for the copy.

Because of the rigidity and precise arrangement of the structure making up the apparatus, the apparatus is not subject to vibration and axial adjustments of the relative spacings of the objective and the subject holder relative to the film platen may be made without altering their precise angular disposition and alignment to the optical axis of the apparatus. These features, plus the fact that the same objective is utilized both in the original projection of the subject to the film and in the subsequent projection of the film image to the subject holder makes it possible to obtain excellent reproductions or copies of the original. Moreover, by following techniques such as described in my mentioned patent application, Ser. No. 836,317, it is also possible to differently expose several films of the same subject or to make several copies of one film image, the copies or film images being taken under different conditions of objective focusing and illumination of the subject and thereafter to combine them into a composite which will have a clarity, line delineation and uniform line intensity considerably improved over the original.

Success of such a project as well as copy work generally depends on an ability to hold the films and/or the negatives processed therefrom both in the same axial aligned or registered relation to the optical axis of the apparatus, but most importantly in the same reference plane. The developed film emulsion must be located in exactly the same reference plane when it is projected back to the subject holder as it was when first exposed. To the extent that the film emulsion is distorted as by locating a cover glass thereover or wrinkling of the film the composite or copy will suffer.

In my mentioned application for patent, Ser. No. 836,317, I describe grinding the film-supporting surface of the transparent platen to as flat a plane as practicable which I accurately and precisely angle to the optical axis of the lens or platen. I also describe arranging a frame spaced about the peripheral edge of the platen in order to leave a continuous narrow channel thereabout to which an air-evacuating pump is connected. Also, along the upper side of the frame I describe locating registration pins by means of which prepunched film and negatives processed therefrom may be located on the platen surface in the same axial relation to the objective; because the film is so dimensioned that its margin overlies the surrounding channel the image area of the films and negatives can be tightly drawn against the platen surface and in the same registered relation.

I, however, have found that variables such as film thickness, rigidity or flexibility and other physical characteristics which vary between individual films as well as between a film and the negative processed therefrom, the film or negative does not every time exactly conform to the surface shape of the platen. This is because of the tendency of the film margin immediately adjacent the channel to seal with the inner edge of the channel before the air is fully withdrawn from between the platen surface and the overlying film. Furthermore, the air entrapped between the film and platen surface may vary in amount and also in location over the image area. The images formed in the emulsion are not always located in the same reference plane and the variation therefrom is random and cannot be predicted.

It is therefore a principal object of this invention to provide photographic apparatus, for example the camera-projector above described, with means which will facilitate more accurately and precisely drawing the film or negatives to the supporting surface of the platen than previously possible.

In accordance with this object, this invention provides means which delay or inhibit seal of the outer margin of the film or negative adjacent the evacuation channel until the air more centrally of the platen surface beneath the film has been withdrawn.

Thus, it is a feature of the invention that the inner edge of the channel or periphal edge of the platen is notched, grooved or otherwise provided with openings which establish communication between the air evacuation channel and an area of the platen surface beyond the shoulder of the inner wall of the channel where the film tends to first seal as it is drawn into the mouth of the channel mouth during the evacuation of air therefrom.

A further feature of the invention is that means outside the image area of the film are provided to resist or delay the drawing of the overlying film margin into the channel. One way I so this is by locating the shoulder of the outer wall of the channel about the platen at a height such that it defines a plane which is higher than the plane defined by the shoulder of the inner wall of the channel. A second way I do this is by providing restricting means which bridge the channel at spaced intervals about the platen.

A further feature of the invention is the novel means which I employ for supporting the platen within its encircling frame.

In accordance with the invention, the edge of the platen which constitutes the shoulder of the inner wall of the channel is slightly beveled and retaining clips are employed to bridge the channel at spaced intervals and engage said beveled edge. These clips have their outer ends fastened in provided recesses off the frame and the underside of their inner ends being complementarily inclined to engage the beveled edge of the platen to retain the platen in secured position. The outer planar surfaces of the clips, however, are substantially flush with the surface of the platen so as to avoid any warping of the film at the platen edges; and the width, spacing, as well as number of said clips serve not only to securely hold the platen in place but also provide resistance to the film margins being drawn into the channels. Preferably, the upper surface of the clips are grooved across the channel bridging area thereof to further facilitate conformity of the film in that area to the pull of the air-evacuating pump.

Ancillary to the above-described role which the beveled edges of the platen play with the retaining clips, the beveled shoulder may also soften any remaining tendency of the film to warp as it is pulled into the channel under the force of the evacuating pump.

Thus it is an important feature and/or advantage of the invention that means are provided whereby films and/or negatives processed therefrom can be drawn tightly into conformity with the surface of the platen without wrinkling and entrapment of air therebeneath. Of consequence, the image area of both the film and the processed negative can be repetitively located in the same reference plane and subject to a minimum of distortion or variance from said plane.

Still another feature, and/or advantage of the invention is the convenient simple, but highly practical manner which is provided for mounting the platen to the first surface of the condenser. Because the platen is separate from the condenser and is not fused or otherwise cemented thereto, its opposed surfaces, and particularly it film receiving surface, can be formed while the platen is separated from the lens holder. Thereafter the platen with its ground surfaces can be conveniently assembled in the frame and secured by the retaining clips in a proper axial aligned position relative to the condenser without disturbing or injuring the ground planar parallel surfaces thereof.

Many other objects, advantages and/or features of the invention will be apparent from the more specific description of a preferred embodiment of the invention which will now be described in connection with the several figures constituted by the accompanying drawings.

In said drawings:

FIG. 4 is a sectional view taken along lines 4—4 of FIG. 2 looking in the direction indicated by the arrows and illustrates on an enlarged scale the manner in which the retaining clips are utilized to secure the film platen;

FIG. 5 is a fragmented plan view of the retaining clips as illustrated by FIG. 4;

FIG. 6 is a sectional view taken along lines 6—6 of FIG. 2 looking in the direction indicated by the arrows and shows details of the platen and the registration pins utilized therewith to locate film on the platen;

Figure 1:
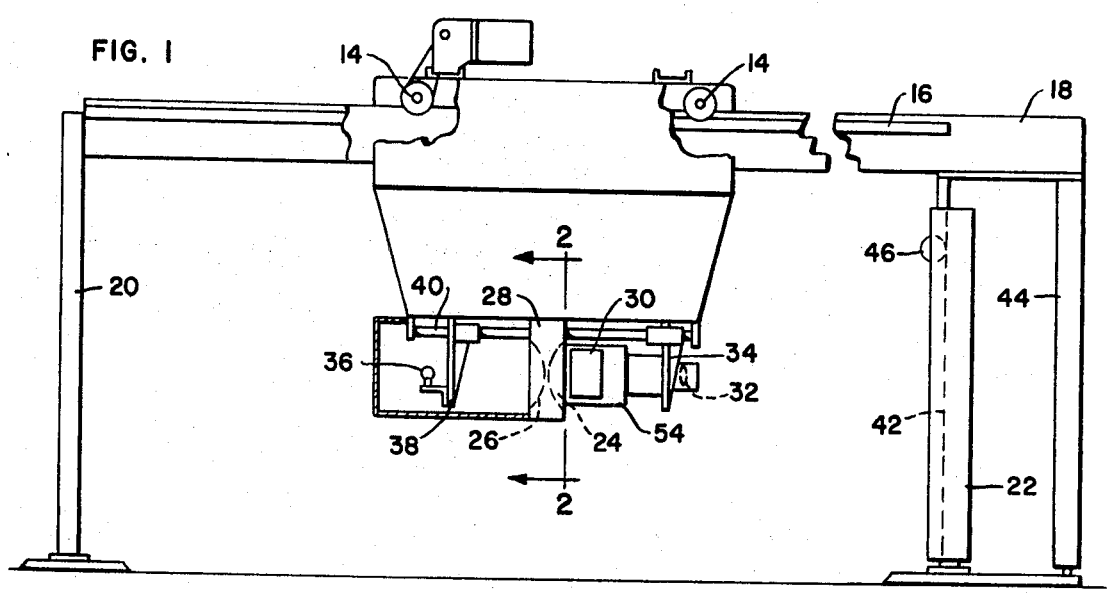
FIG. 1 is a side elevational view of a photographic apparatus with which the invention is utilized.

Referring now more particularly to the several views wherein like parts are identified by like reference numerals, FIG. 1 illustrates a camera-projector with which the present invention is useful. Such an apparatus is disclosed and claimed in my mentioned copending application for U.S. Pat., Ser. No. 836,317, to which reference may be had for a fuller understanding of its construction and operation. However, for purposes of understanding this invention, it will suffice to point out that the apparatus illustrated by FIG. 1 comprises an optical head indicated generally at 12. Said optical head is suspended by front and rear pairs of wheels 14 which move along a pair of tracks 16 mounted on opposed sides of an overhead rigid supporting structure 18 shown supported at one end by columnar structure 20 and at its forward end by structure comprising a subject holder 22 relative to which the optical head moves. The optical head 12 comprises a pair of planoconvex condenser lenses 24, 26 arranged with their convex surfaces facing, as is conventional. Said condenser lenses are enclosed within a dusttight boxlike enclosure or supporting structure 28 having an axially aligned light aperture in the front and rear walls thereof. As will afterwards be explained more in detail, the forward wall of structure 28 comprises a jig plate 50 having a light aperture 62 of generally rectangular shape over which is supported the film platen 72 comprising the present invention. Access to said platen 72 for locating the film or negative thereon is obtained through door 30 in plenum 54. At 32 is an objective supported by lens board 34 and at 36 is a point source of light supported by light board 38. Lens board 34 and light board 38 are mounted on massive sized rigid precisely related tubular ways 40 which accommodate axial adjustment of the spatial relation of the objective and point source of light relative to the film platen 72.

Subject holder 22, as more particularly illustrated and described in my mentioned copending application, comprises a vertically disposed translucent member 42 having a planar subject-receiving surface facing the optical head 12 and surrounded by a peripherally located continuous channel connected to an air evacuating pump, not shown. At 44 is a structure supporting fluorescent bulbs or other illuminating means by which the translucent member 42 may be back-lighted. At 46 is a roll of pliofilm or other suitable flexible transparent plastic sheet secured at the top of the subject holder and dimensioned to overlie the mentioned air-evacuating channel about the periphery of the translucent member 42 when unrolled. Sheet material to be copied or sensitive paper on which an image of the copy is to be printed is located within the area of the translucent member 42 defined by the air-evacuating channel and the pliofilm roll 46 unrolled thereacross so as to be drawn tightly against the surface of the subject holder 42 with evacuation of air from the mentioned channel. The unrolled pliofilm sheet thus tightly holds the sheet material or sensitive paper against the flat vertical surface of the translucent member 42 during the photographing or projection printing operation.

Optical head 12 as thus described may be utilized as a camera with its point source of light 36 deenergized or as a projector when the light source is illuminated. The optical head is moved toward or away from the subject holder to locate its film platen 72 at the proper spatial setting or distance from the surface of the subject holder 22 to introduce a desired image reduction factor when the apparatus is used as a camera or to induce a magnification factor when it is used as in projection printing. The objective 32 is independently adjustable on ways 40 toward and away from the film platen 72 by moving lens board 34 and this adjustment serves to sharpen the focus of the projected image.

Figure 2:
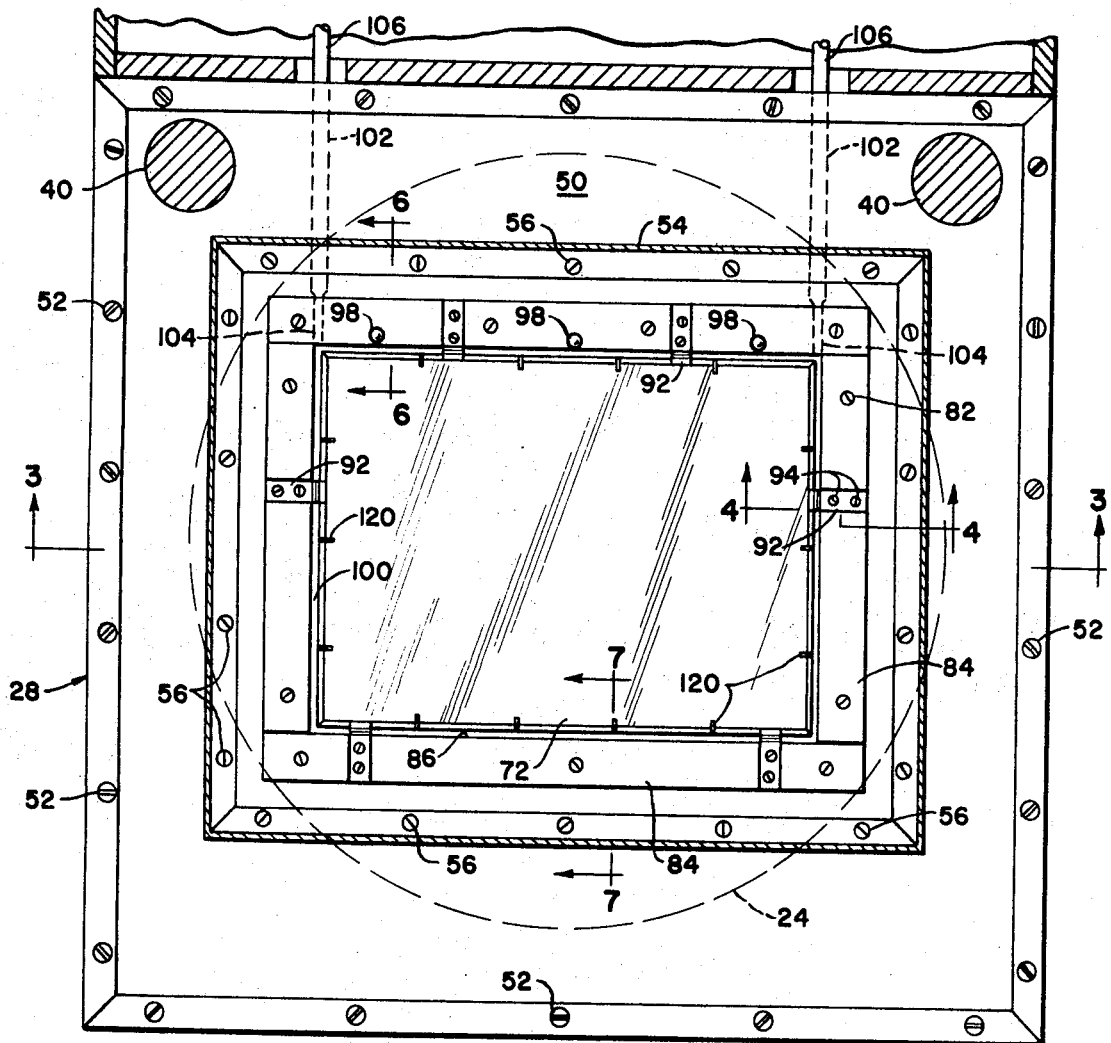
FIG. 2 is a view taken along lines 2—2 in FIG. 1 looking in the direction indicated by the arrows and is a plan view of the film platen and illustrates its manner of mounting on the condenser lens supporting structure.
Figure 3:
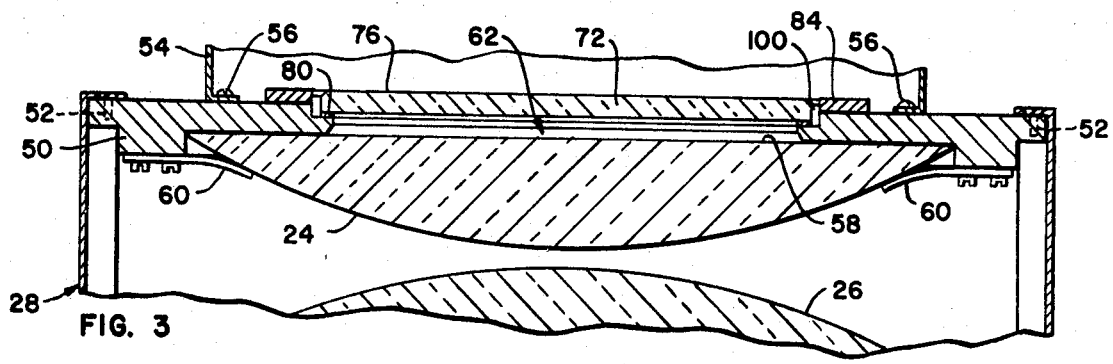
FIG. 3 is a sectional view taken along lines 3—3 in FIG. 2 looking in the direction indicated by the arrows and shows further details of the manner of mounting film platen to the condenser lens supporting structure.
Figure 7:
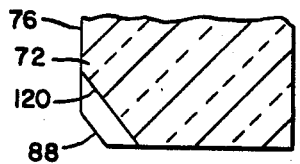
FIG. 7 is a sectional view taken along lines 7—7 of FIG. 2 and illustrates the inclined notches in the periphery of the platen on a considerably enlarged scale.
Figure 8:
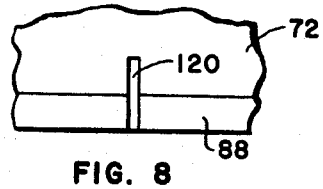
FIG. 8 is a fragmented plan view of the portion of the platen illustrated in FIG. 7.

Referring therefore now to FIGS. 2 through 8, and first to FIGS. 2 and 3, the novel construction of film platen and supporting structure therefor comprising the present invention will be described. As shown best by FIG. 3, the condenser lens housing 28 includes a front jig plate 50 to which the flanged end of the condenser lens housing sidewalls are secured as by screws 52. Jig plate 50 also serves as means to which the film plenum or housing 54 is secured, as by screws 56. The rear or inner side of jig plate 50 is suitably recessed to provide a circular seat which receives the flat surface 58 of the front condenser lens 24. Said condenser lens 24 is removably secured to the jig plate as by clips 60. Rubber or other suitable cushioning material may be located between the clips 60 and the convex surface of the condenser lens which they engage. Light aperture 62 in the jig plate 50 is of generally rectangular shape and will have dimensions corresponding to the most useful, optically speaking, area of the condenser lens. The inner peripheral wall of the jig plate defining said light aperture 62 is suitably recessed, as shown in FIG. 4, to define a lip 64 providing a continuous surface 68 on which the outer margin of the transparent platen 72 seats and an upstanding wall 70 which is disposed essentially normal, i.e., at right angles, to surface 68. Surface 68 of the lip 64 is carefully machined so that it defines a plane paralleling the plane of the flat surface 58 of the front condenser lens 24 which is assembled with the jig plate on its rear side. Said surface 68 is therefore disposed at right angles to the optical axis of both the objective and the condenser lenses, as well as to the direction in which the optical head and objective move along track 16 and ways 40. Transparent platen 72 is generally rectangular in shape and has a length and width slightly larger than the corresponding dimensions of aperture 62 so that it may stably seat on lip 64. Its length and width, however, are less than the separation of the opposed standing walls 70 about the lip so as to form a continuous channel 100 about the periphery of the platen. Preferably, surface 68 of the lip is covered by a thin strip of tape 80 adhesively coated on both surfaces. Said tape aids in locating the platen on the lip during assembly. It also cushions and seals the outer margin of the platen to said lip surface 68. Prior to its assembly, the outer or film receiving surface 76 and inner surface 78 of the platen are ground substantially flat and parallel to each other. As illustrated, the thickness of the transparent platen 72 exceeds the height of the upstanding wall 70. This results from the practical reason that there is a minimum thickness of glass which can be most effectively ground within the accepted tolerances. This, however, is taken care of by securing and encircling framing plate 84 to the forward side of the jig plate 50, as by screws 82, so that its inner wall 86 is substantially flush with the inner wall 70 of the jig plate and together therewith forms the outer wall of the channel 100. The thickness selected for framing plate 84 is such that its upper flat surface defines a plane slightly higher or beyond the plane defined by the outer surface 76 of the platen 72. In the flat upper surface 89 of said frame plate 84 are recesses 90 suitably spaced about the periphery of the channel 100 or platen 72. In said recesses 90 are fastened retaining clips 92 as by screws 94. Said clips 92 have portions which bridge across the channel and terminate in beveled ends which overlying engage the peripheral shoulder 88 of the platen which is complementarily beveled. The depth of said beveled shoulder 88 and the thickness of the clips 92 are so related that the outer surface of the clips are substantially flush with the outer surface 76 of the platen. Openings 96 in the retaining clips through which fastening screws 94 extend are preferably elongated in the direction of the platen edge to accommodate their axial adjustment to appropriately secure the platen in position centered over the light apertures 62 with continuous channel 100 about the periphery thereof. The fastening screws 94 are then tightened and the elongated openings filled with a suitable mastic material.

Considering now FIG. 6 with FIG. 2, along the upper edge of the platen to the outside of channel 100, registration pins indicated generally at 98 are press fitted into provided openings in the framing plate 80. As shown in FIG. 2, the pins 98 comprise three in number although any other convenient number of pins may be utilized. Under some circumstances, as when working with larger sized films, registration pins 98 may also be provided in frame 80 along the bottom edge of the platen, or along all four sides thereof. As illustrated by FIG. 6, each said registration pins includes an inner cylindrical portion 98a and an outer or entrant more spherical or tapered portion 98b. The cylindrical portion 98a of said registration pins has a height of approximately 0.035 inches or at least the thickness of the film of which the apparatus is utilized. The diameter of the cylindrical portion 98b is the same as or slightly larger than the diameter of the circular openings which are punched in the film F, so that the film snugly fits and is not loose about the pins; and the entrant end 98b of the pins progressively decreases in diameter therefrom to its outer end for easier impalement and removal of the films. The registration pins thus serve to exactly register each film, including those in which the punched holes may be slightly out of line, each time in the same axial relation to the objective point of light source and other structure of the apparatus.

Channel 100, as shown in FIG. 2 is connected by suitable conduits to an air evacuating pump (not shown). Said conduits comprise a pair of openings 102 which are drilled through the jig plate 50 from spaced locations in their upper edge of the jig plate 50 from terminate in sections 104 of smaller diameter disposed immediately below the channel 100, as illustrated by FIG. 4. The reduced diameter of said openings 104 is selected to avoid breaking into the wall of the lip 64. Openings 102 provide connection to piping illustrated at 106 leading to the air evacuating pump and the inner ends of said openings of reduced diameter 104 establish communication with the channel 100 by milled section 108 in the base of said channel. Thus, as illustrated by FIG. 4, as well as FIG. 2, the dimensions of film F are selected so that its marginal portions overlie channel 100 on all four sides of the transparent platen when properly assembled with its prepunched openings over registration pins 98. Evacuation of air from the channel 100 under the pull of the mentioned pump will therefore withdraw the air from between the film F and the film supporting surface 76 of the platen 72 to cause the film F to conform to the flat shape of the platen surface 76. In the large film sizes with which the present invention is concerned (in the order of 8×10 inches) I have noted that there is a tendency for the film to seal at the outer shoulder of the platen constituting the inner wall and channel before all of the air has been withdrawn into the channel from beneath the more central or image area of the film. This results in wrinkles and distortion in the image area. One way to compensate therefor is for the operator to quickly wipe across the film. However, unless particular care is exercised in the wiping action there is the possibility of injuring the emulsion layer. I have found that by increasing the height of the framing plate such that shoulder 114 of the outer wall of the channel 100 lies in a plane above the plane of the outer or film receiving surface 76 of the platen, as illustrated at a in FIG. 6, the slight upward deflection of the film over the channel tends to momentarily delay the pull of the film into the mouth of the channel 100 under the force of the air evacuating pump. This pull of the film into the channel 100 is also resisted by the portions of the retaining clips which span the channel 100.

However, it is a feature of this invention that I also notch the peripheral edge of the film platen 72 at selected intervals between the clips 92 and at a sufficient inclination that the channel has communication with the film-receiving surface 76 of the platen inwardly of its outer shoulder 88 and therefore beyond the point at which the film tends to initially seal in response to evacuation of air from channel 100. As illustrated by FIG. 6, these slots 120 should be inclined at an angle steep enough to establish their communication with the channel 100 not only below the bevel, but below the expected depth to which the film may be drawn into the channel under the pull of the air evacuation pump and it also should extend far enough inwardly of the outer edge of the surface 74 of the platen to be beyond the point of initial seal. I have found that a useful angle of inclination will be in the order of 30° to 40° to the platen surface 76. Preferably the opening of the slot 120 into the platen surface 76 will lie wholly outside the periphery of the light aperture 62 as defined by lip 64 at A—A (FIG. 6) so that any warping at its opening into the platen surface 76 will fall outside the image area of the film. However, the width of these slots can be so minute that, in fact, they will introduce essentially no noticeable distortion or warping of the film. For example, in a typical construction wherein the transparent platen has a dimension of approximately 8×10 inches slots 120 may have a width of only a few thousandths of an inch. Advantageously, however, they should be uniform in size and more or less equally spaced about the periphery of the platen. To assume maximum hold down of the film a portion of the clips 90 which bridge the channel should also be grooved the full width of the clip as at 122 and the groove width should approach the width of the channel 100. The illustrated vee-shape permits a maximum width of groove.

It will thus be apparent that each film can be accurately aligned on the film platen surface 76 by means of the registration pins 98 and in response to the air evacuation pump will be caused to tightly conform to the platen surface 76 with essentially no air entrapment therebetween. Of consequence, the emulsion layer of the film will always be located in the same reference plane, as well as in the same angular and axial disposition to the objective and subject holder.

Thus it will be apparent from the aforedescription that all of the recited objects, advantages and features of the invention have been demonstrated as obtainable and in a highly practical convenient manner. Furthermore, it will be understood that the aforesaid description is not to be taken in a limiting sense, but as exemplary of one form of the invention, the scope and limits of the invention being defined by the claims hereto appended.

Thus having described my invention, I claim:

1. In an image-projecting system including a condenser lens and an objective lens spaced forwardly thereof, means on the side of the condenser lens facing the objective which define a film supporting surface axially aligned with the condenser lens and objective lens, said surface having a peripheral edge, and a continuous air-evacuating channel about said peripheral edge of said film supporting surface, film registration means along at least one side of said film-supporting surface for locating a film on said supporting surface with its margins overlying said air-evacuating channel, said air-evacuating channel having an inner wall at the peripheral edge of the film supporting surface, an outer wall opposite said inner wall and a base wall therebetween, and spaced openings in the inner wall of said air evacuating channel which communicate at one end with the channel and at their other end with the film supporting surface at a locus inwardly of its peripheral edge.

2. The combination of claim 1 wherein the outer wall of said channel is wider than the inner wall to define a shoulder forward of the film supporting surface.

3. The combination of claim 1 wherein the film supporting surface is flat, the inner wall of the channel is at right angles thereto, and the openings comprise slots disposed at an angle intermediate the disposition of said inner channel wall and film supporting surface.

4. The combination of claim 1 wherein the film-supporting surface is rectangular in shape and the openings comprise narrow slots disposed in the edge of the film supporting surface at an acute angle with respect to the film-supporting surface.

5. The combination of transparent, solid means defining a film-supporting surface axially aligned with the lens means of an image-projecting device and surrounded by a continuous air-evacuating channel, said channel having an inner wall with an upper shoulder adjacent the film-supporting surface and an outer wall with an upper shoulder opposite said inner wall, film holding means for locating a film on said surface with its image area centrally of said surface and its margins overlying said channel, conduit means connecting said channel to an air evacuator operable to withdraw air from said channel, and further means outside said central area of the film supporting surface which underlies the image area of the film, said further means preventing seal of the film margins with the shoulder of the inner wall of the channel before the film margin seals with the shoulder of the outer wall of the channel as said film margins are drawn into the channel in response to evacuation of air therefrom so as to increase the evacuation of air and reduce entrapment of air between the image area of the film and the supporting surface as the film margins are drawn to the channel whereby the image area of the film will closely conform to the film supporting surface.

6. The combination of claim 5 wherein said further means includes the upper shoulder of the outer wall of the channel which is higher than the upper shoulder of the inner wall of the channel and the film supporting surface.

7. The combination of claim 5 wherein said further means includes inclined slots in the inner wall of the channel adjacent the film-supporting surface which communicate with the channel and the film supporting surface at a locus spaced inwardly of said channel.

8. In combination, a condenser lens holder which includes a light aperture containing member to overlie one side of the condenser lens, a transparent platen supported on said member over said aperture and having a film-supporting surface, means defining a continuous channel about the film-supporting surface of said platen which connects to an air evacuator, spaced film registration pins along an edge of said surface which locate a film on said surface with its margin overlying the channel, and said channel having an inner wall adjacent the film supporting surface with indentations at spaced intervals which communicate with the channel and the film supporting surface.

9. The combination of claim 8 wherein the inner wall of the continuous channel has a shoulder in the plane of the film-supporting surface and the channel has an outer wall spaced from the inner wall and more remote from the film-supporting surface, said outer wall of the channel having a shoulder comprising a plane above said plane of the film-supporting surface.

10. The combination of claim 8 wherein the shoulder of the inner wall of the channel is beveled.

11. The combination of claim 10 wherein the indentations comprise slots which are inclined and of a length so as to establish communication with the channel below said beveled shoulder and with the film supporting surface of the platen inwardly of said beveled shoulder.

12. The combination of claim 11 further including spaced bridging elements which extend across the channel and engage the beveled shoulder of the inner wall of the channel.

13. In combination, a condenser lens and a condenser lens holder including a light-aperture-containing frame member which overlies one side of the condenser lens, said frame member having an upper surface and a continuous lip about the periphery of said aperture which is disposed below the upper surface of said member and an upwardly extending wall surface between said lip and said upper surface, a transparent platen having an upper film receiving surface and mounted with its lower peripheral edge seated on said lip and spaced from said upwardly extending surface to define a continuous channel peripherally disposed about the film-receiving surface of the platen, conduit means communicating with said channel for connection to an air evacuator, retaining clips engaging the periphery of said platen and fastened to said member so as to secure the platen thereto, and the upper peripheral edge of said platen being notched at spaced intervals providing communication of the channel with marginal portions of the platen surface inwardly of the channel when a film is located on the platen with its margin overlying said channel to facilitate drawing the film into close conformity with the platen surface with evacuation of air from the channel.

14. The combination of claim 13 wherein the upper peripheral edge of the platen is beveled and the retaining clips have one end engaging said beveled upper peripheral edge of the platen, the clips being secured within a provided recess in the frame member, and the upper surface of the clip being essentially flush with the upper platen surface.

15. The combination of claim 14 wherein the portion of the clip bridging the channel includes a groove on its upper side.

16. The combination of claim 14 wherein the surface of the platen is in a plane below that of the frame member.

17. The combination of claim 13 wherein the frame member includes film registration means along at least one side edge of the platen with which film is registered in mounting on the film receiving surface of the platen.

18. The combination of claim 17 wherein the upper platen surface is vertically disposed and comprises a rectangular-shaped flat surface.

* * * * *